Feb. 1, 1938.          R. H. DRAEGER          2,106,726
FILM SPOOL AND CONTAINER
Filed Nov. 14, 1935
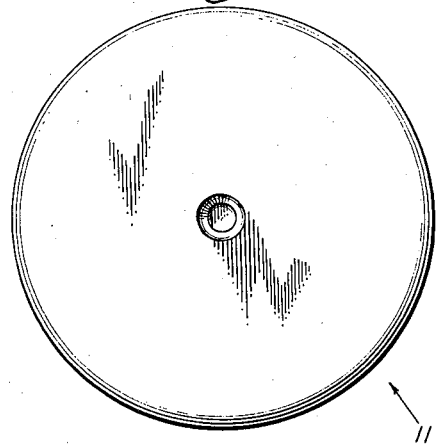
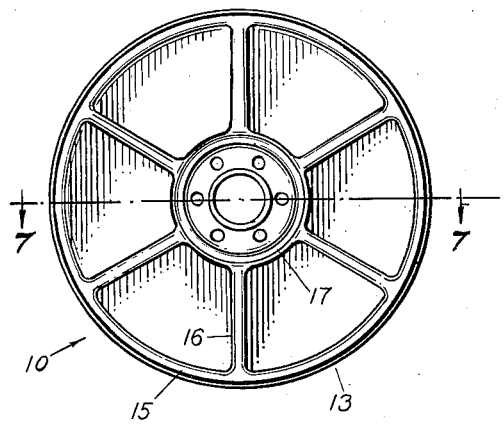
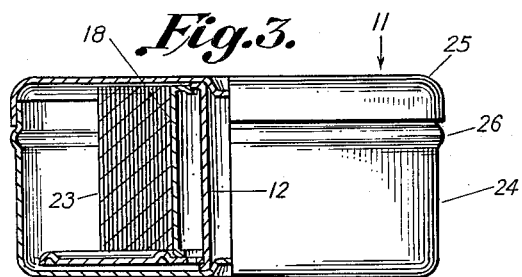
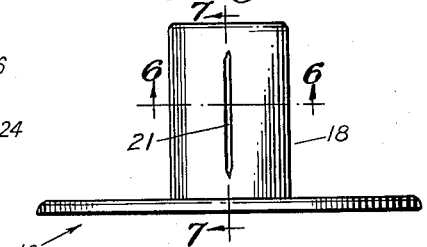
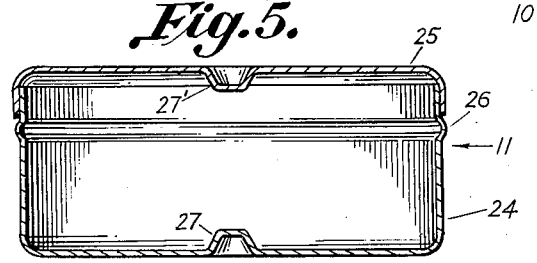
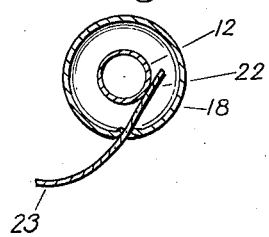
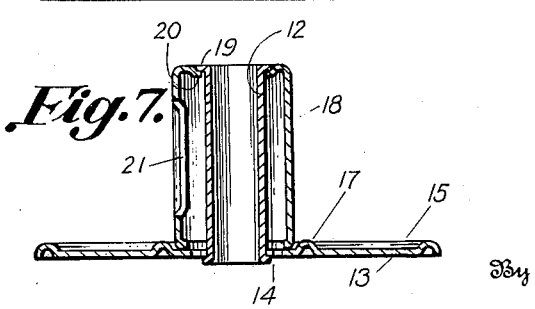
Inventor
RUPERT H. DRAEGER.
By Robert A. Lavender,
Attorney Patented Feb. 1, 1938

2,106,726

UNITED STATES PATENT OFFICE 2,106,726

FILM SPOOL AND CONTAINER

Rupert H. Draeger, United States Navy

Application November 14, 1935, Serial No. 49,755

3 Claims. (Cl. 242—71)

(Granted under the act of March 3, 1883, as amended April 30, 1928; 370 O. G. 757)

This invention relates to a film spool and spool container.

It has for an object to provide an improved reel spool for holding photographic film or photographic prints which are in the form of long strips and which are best stored when coiled into a roll.

Another object of this invention is to provide a spool which will contain any amount of film up to a certain maximum and to provide a holder especially designed for the particular spool, which holder will cooperate with the spool and protect the film in storage, without needless waste of space, against dust and damage and yet at the same time offer ready access to the spool and film.

As a further feature of this invention, the spool is in the form of a half-spool; that is, it has a central hub and only a single flange extending from one end of the hub.

With the above and other objects in view, the invention consists in the construction, combination and arrangement of parts as will be hereinafter more fully described.

In the drawing:

Fig. 1 is a top plan view of the spool container;

Fig. 2 is a top plan view of the spool per se;

Fig. 3 is an edge view, partly in section, of the film container with a spool of film in position therein;

Fig. 4 is a side view of the film spool of Fig. 2;

Fig. 5 is a vertical sectional view of the empty film spool container; and

Figs. 6 and 7 are sectional views on lines 6—6 and 7—7 of Fig. 4 and Fig. 2 respectively.

There is shown at 10 the film spool of this invention, the container therefor being shown at 11. The spool 10 and the container 11 are both preferably made of pressed metal.

The spool 10 includes a central hollow hub 12 to one end of which is secured a circular flange 13, the end of the hub 12 being crimped over as at 14 for securing the hub and flange together.

The flange 13, as clearly shown in Fig. 2, is provided with a peripheral strengthening rib 15. Extending inwardly, strengthening rib 15 has a plurality of ribs 16 leading to an inner circular rib 17. An outer hub 18 is secured about the inner hub 12 by having a flare or lip 19 on the outer end of the inner hub 12 extend over a flange 20, the other end of the outer hub 18 abutting against the flange 13 within the circular rib 17. As will be apparent from an inspection of Fig. 7, this construction is in itself sufficient to hold the outer hub 18, inner hub 12 and the flange 13 in assembled relation to each other.

The outer hub 18 is provided with a depressed slit 21 through which a tapered end 22 of the film 23 may pass to abut against the inner hub 12 and thus lock the film end on the spool and allow it to be rolled about the outer hub 18. The distance between the ribs 16 and 17 and the other end of the outer hub 18 is substantially equal to the width of the film 23 to be rolled thereon.

The container 11 is in the form of a cylindrical box member 24 and a cylindrical cover 25 overlapping the upper edge of the cylindrical box member 24 as far as the circumferential rib 26. The centers of the box member 24 and the cover 25 are depressed to provide cone-shaped spindles 27 and 27', the cone-shaped spindles entering into the hollow within the inner hub 12 of the spool 10 and thus lock the spool 10 positively against rattling within the container when the cover is in position thereon.

The invention described herein may be manufactured and used by or for the Government of the United States of America for governmental purposes without the payment of any royalties thereon or therefor.

I claim:

1. A film spool comprising a flange, an inner hub extending from said flange with a flared end of said inner hub penetrating said flange, an outer hub enclosing said inner hub, an external flare on the other end of said inner hub and a flange on said outer hub underlying said flare on said inner hub to hold said hubs and flange in assembled position.

2. A film spool comprising a flange, an inner hub extending from said flange with a flared end of said inner hub penetrating said flange, an outer hub enclosing said inner hub, an external flare on the other end of said inner hub and a flange on said outer hub underlying said flare on said inner hub to hold said hubs and flange in assembled position, said outer hub having a depressed slit therein to receive and lock an end of the film roll therethrough.

3. A film spool comprising a flange, an inner hub extending from said flange with a flared end of said inner hub penetrating said flange, an outer hub enclosing said inner hub, an external flare on the other end of said inner hub and a flange on said outer hub underlying said flare on said inner hub to hold said hubs and flange in assembled position, a cylindrical covered box, hub engaging members extending into the top and bottom of said cylindrical covered box, said inner hub of said spool being hollow and being adapted to be held between said hub engaging members within said box.

RUPERT H. DRAEGER.